US007408514B2

United States Patent
Go (10) Patent No.: US 7,408,514 B2
(45) Date of Patent: Aug. 5, 2008

(54) SPEAKER OF A PORTABLE TERMINAL HAVING A RESONANCE SPACE

(75) Inventor: Sung-Soo Go, Seoul (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 11/120,246

(22) Filed: May 2, 2005

(65) Prior Publication Data

US 2006/0083401 A1  Apr. 20, 2006

(30) Foreign Application Priority Data

Oct. 18, 2004  (KR) .................. 10-2004-0083000

(51) Int. Cl.
*H01Q 1/24* (2006.01)
(52) U.S. Cl. ...................... 343/702; 455/90.3
(58) Field of Classification Search ............ 343/702, 343/718, 700 MS, 866; 381/396; 455/90.3, 455/575.1
See application file for complete search history.

(56) References Cited

U.S. PATENT DOCUMENTS

| 2003/0190896 | A1* | 10/2003 | Ota et al. | 455/90.3 |
| 2006/0097927 | A1* | 5/2006 | Satoh et al. | 343/702 |
| 2006/0152417 | A1* | 7/2006 | Ying et al. | 343/702 |

* cited by examiner

*Primary Examiner*—HoangAnh T Le
(74) *Attorney, Agent, or Firm*—The Farrell Law Firm, PC (57) ABSTRACT

A speaker of a portable terminal having a resonance space defined in the portable terminal such that the sound can advance in multiple directions through the resonance space, thereby enabling a user of the terminal to hear a large volume of high quality sound. The speaker includes an internal antenna module disposed at an upper inner portion of the body of the portable terminal and defining a resonance space, and a speaker module integrally assembled with the internal antenna module and disposed under the resonance space formed under the main PCB. Sound generated by the speaker module advances in multiple directions after passing through the resonance space regardless of whether the folder is opened or closed.

12 Claims, 8 Drawing Sheets

FIG.1

(PRIOR ART)

FIG.2

(PRIOR ART)

SPEAKER OF A PORTABLE TERMINAL HAVING A RESONANCE SPACE

PRIORITY

This application claims priority to an application entitled "Speaker of Mobile Phone Having Resonance Space" filed in the Korean Industrial Property Office on Oct. 18, 2004 and assigned Serial No. 2004-83000, the contents of which are hereby incorporated by reference.

BACKGROUND OF THE INVENTION

1. Field of the Invention

The present invention relates generally to a speaker for a portable terminal having a resonance space, and more particularly to a speaker for a portable terminal including a speaker module for emanating high quality sound in multiple directions through a resonance space inside the portable terminal.

2. Description of the Related Art

In general, "portable terminals" refer to apparatuses that can conveniently be carried by a user to perform wireless communication. According to their appearance, such portable terminals may be classified into bar-type terminals, flip-type terminals, and folder-type terminals. That is, the bar-type terminal has a single housing shaped like a bar, the flip-type terminal has a flip or a cover which is pivotally mounted to a bar-shaped housing by a hinge unit, and the folder-type terminal has a folder coupled to a bar-shaped housing by a hinge unit in such a manner that the folder can be rotated in order to be folded to or unfolded from the housing.

Additionally, each of the conventional portable terminals necessarily includes an antenna device, data input and output devices, and devices for transmitting and receiving data. The data input is typically a keypad, by which a user can input a data with a finger pressing, or a touch pad or touch screen. A typical LCD may also be used as the data output device.

The conventional portable terminals as described above have antenna devices that can be classified into external antenna devices and embedded antenna devices according to the locations at which the antenna devices are mounted to the portable terminals. More specifically, the embedded antenna devices, which are mounted inside of the portable terminals, impose more spatial restriction on the manufacture of the portable terminals than the external antenna devices.

A portable terminal having such an embedded antenna module as described above is often called an "intenna phone".

Figure 1:
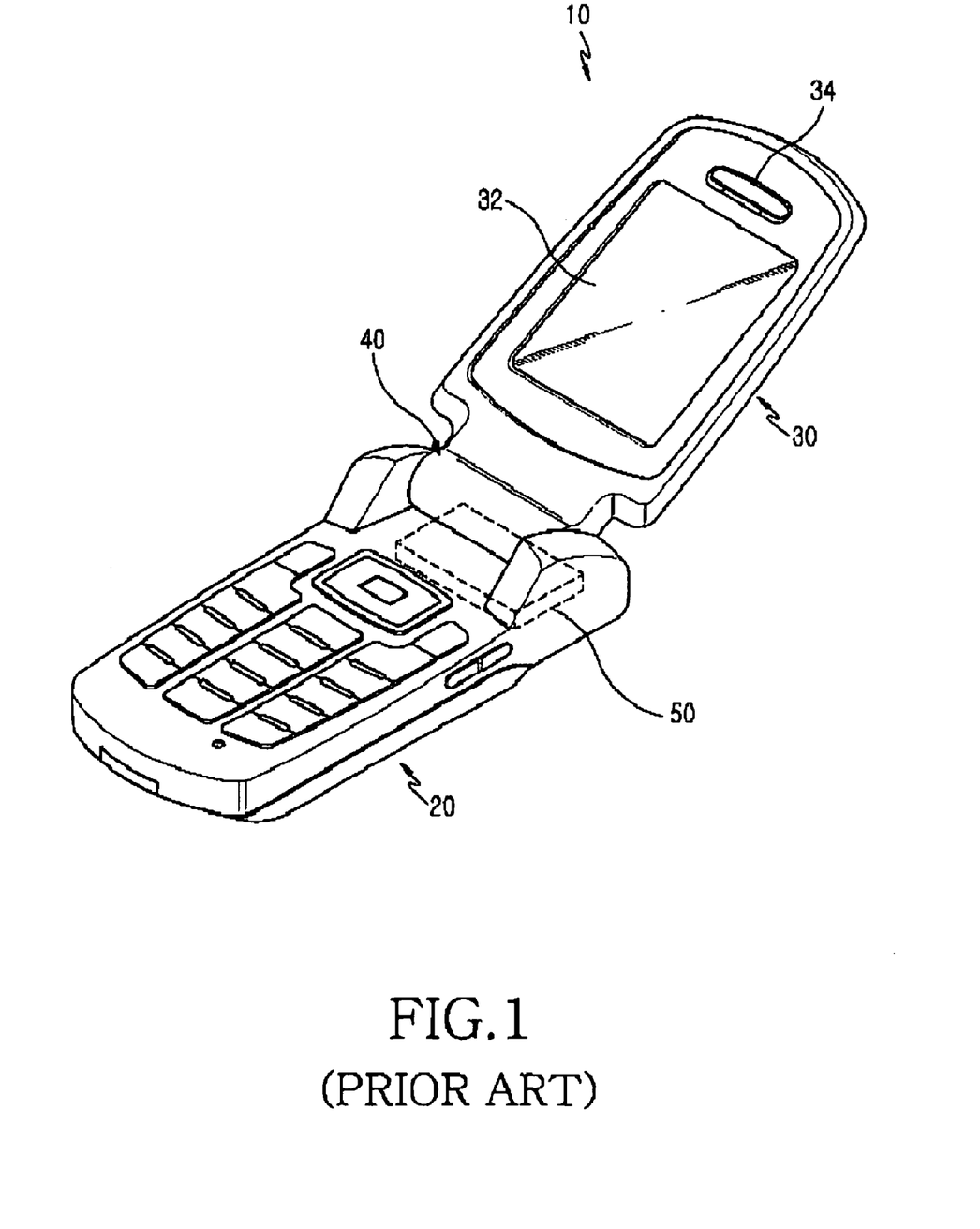
FIG. 1 is a perspective view of a conventional intenna phone with its folder opened.
Figure 2:
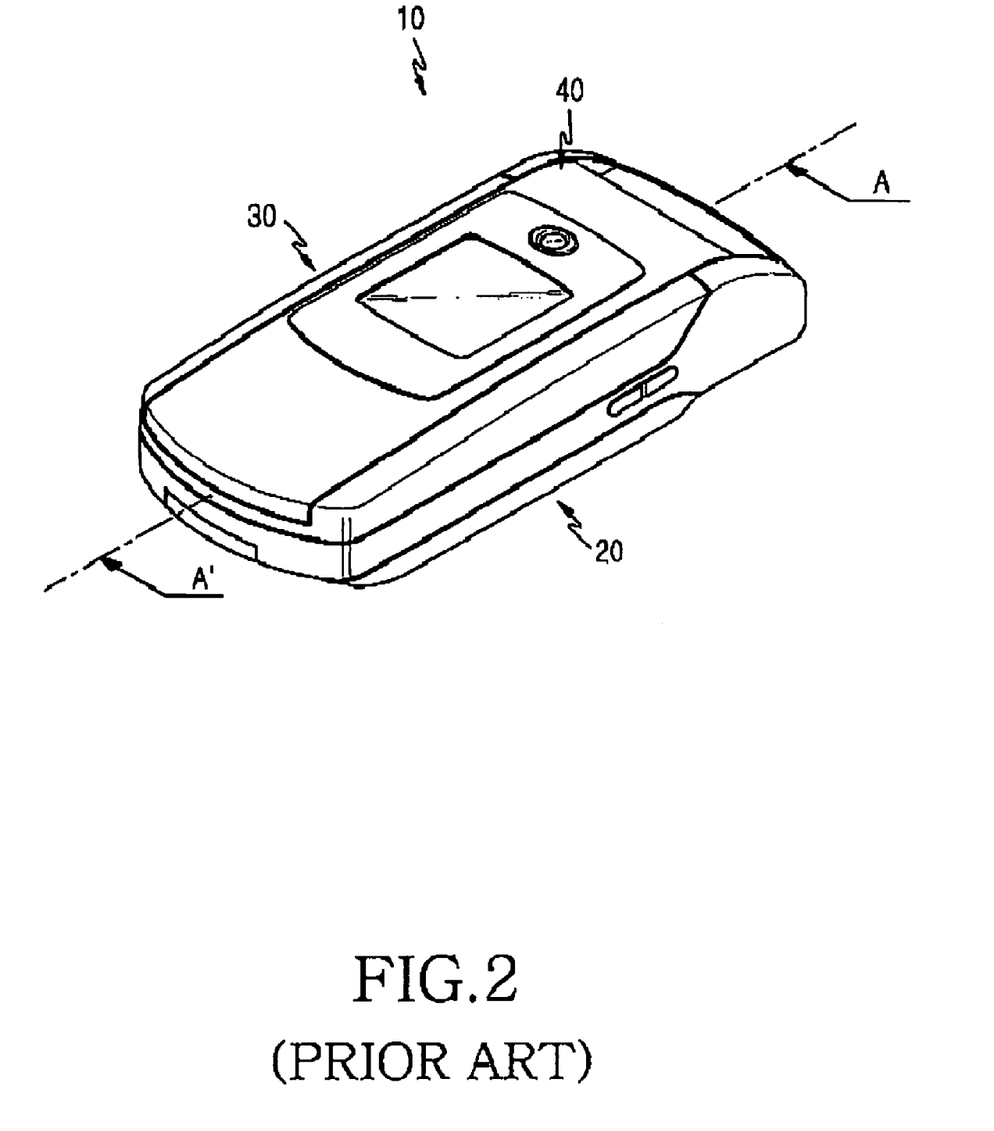
FIG. 2 is a perspective view of the conventional intenna phone with its folder closed.
Figure 3:
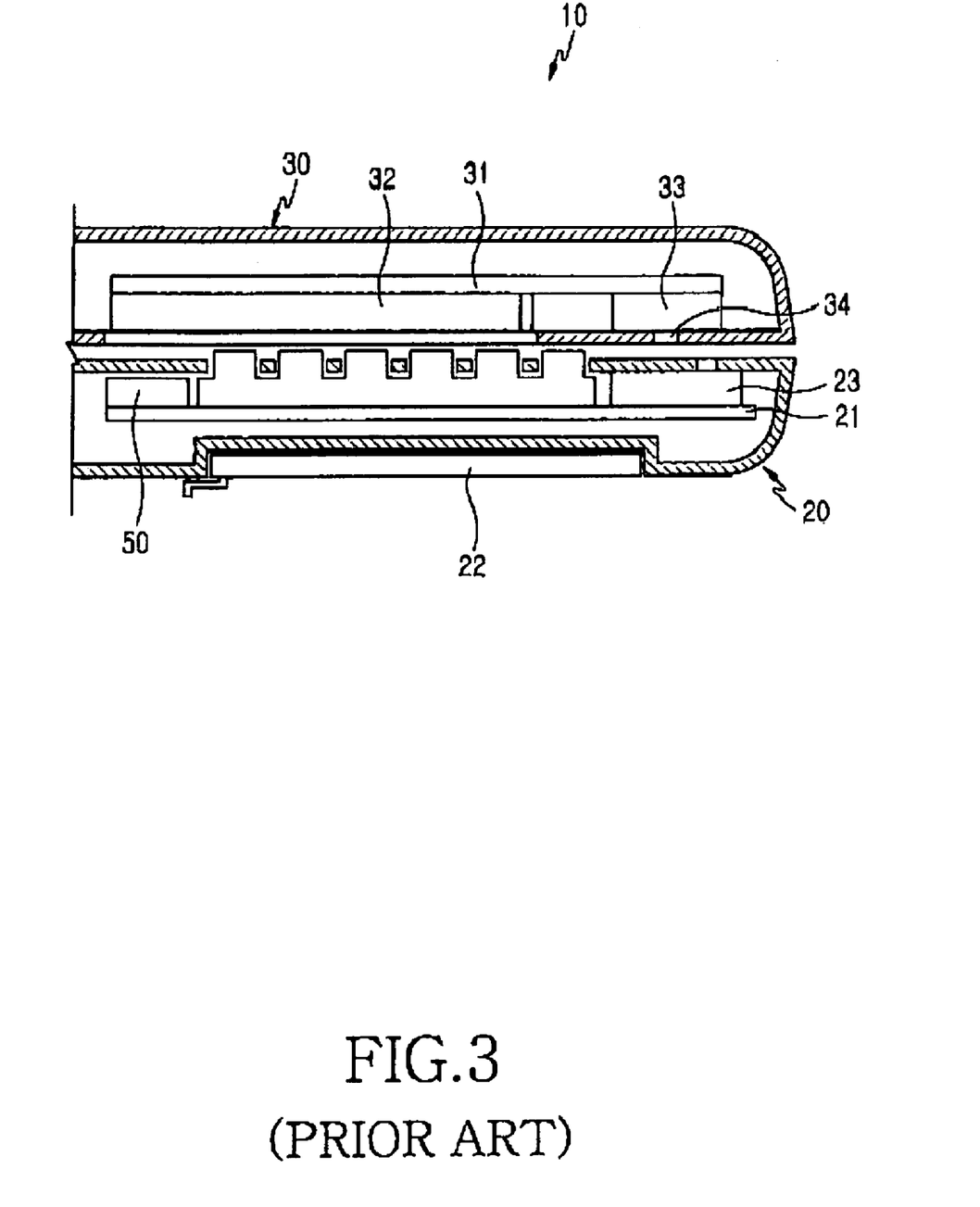
FIG. 3 is a sectional view taken along line A-A' illustrated in FIG. 2.

As illustrated in FIGS. 1 to 3, the intenna phone includes an internal antenna module 50, which is directly mounted on a main printed circuit board (PCB) 21 disposed over a rear side of terminal 10, i.e., over a battery pack 22. When the intenna phone 10 is a folder-type portable terminal, a recess for seating a battery pack 22 is formed on a rear side of the terminal 10 to reduce the internal space of a main body 20 of the portable terminal and most of the internal space of the main body 20 is occupied by the main PCB 21, the battery pack 22 and the internal antenna module 50, so there is no more space for seating a speaker device 33. Therefore, the conventional folder-type intenna phone 10 includes an auxiliary PCB 31 disposed in the folder 30 and a liquid crystal display (LCD) unit 32 and a speaker device 33 mounted on the auxiliary PCB 31.

Thus, the folder 30 has a separate space for housing the LCD unit 32 and the speaker device 33. However, as illustrated in FIG. 3, the speaker device 30 is mounted on the folder 30 without a resonance space, thus producing a poor undertone so that the listener cannot hear a wide range of high quality sound.

In addition, the sound produced by the speaker device 33 mounted on the folder 30 shows a large volume difference between the states when the folder 30 has been open and when the folder 30 has been closed. That is, when the terminal 10 is in the closed state, the main body 20 blocks up a speaker hole 34 of the folder 30, thus lowering the sound volume.

Further, because the speaker device 33 is mounted in such a manner to emanate sound in a single direction, the speaker device 33 may fail to exactly transfer the sound to a listener. Also, because the speaker device is housed in the folder 30 without a resonance space, the sound may be either too small or distorted when it reaches a listener located distant from a direction in which the sound advances.

Further, when the speaker device is adjusted to increase its volume in order to prevent such a distortion, a loop phenomenon such as hauling or echo may occur, thus degrading the sound effect and the communication quality of the portable terminal.

Also, if a terminal includes a plurality of speaker devices and resonance/consonance spaces in order to overcome the drawbacks of the aforementioned prior art, the terminal cannot avoid becoming thicker against the tendency toward the greater compactness and slimness.

SUMMARY OF THE INVENTION

Accordingly, the present invention has been designed to solve the above and other problems occurring in the prior art. An object of the present invention is to provide a speaker of a portable terminal, which has a resonance space defined in the portable terminal, such that the sound can advance in multiple directions through the resonance space, thereby enabling a user of the terminal to hear a large volume of high quality sound.

It is another object of the present invention to provide a speaker of a portable terminal having a resonance space, which has a speaker module integrally assembled with an internal antenna module in a body of the portable terminal and propagating sound through the resonance space defined by the speaker module, thereby eliminating the necessity for a space for the speaker in the folder and reducing the thickness and volume of the portable terminal.

It is still another object of the present invention to provide a speaker of a portable terminal having a resonance space, which has a speaker module integrally assembled with an internal antenna module in a body of the portable terminal and propagating sound through the resonance space defined by the speaker module, such that a user of the terminal can hear high quality sound regardless of whether the folder is opened or closed and the process of manufacturing the portable terminal can be simplified and facilitated.

In order to accomplish the above and other objects, there is provided a speaker of a folder type portable terminal having a resonance space. The portable terminal includes a body having a main printed circuit board (PCB), a folder, and a hinge device for opening and closing the folder onto and from the body. The speaker includes: an internal antenna module disposed at an upper inner portion of the body and defining a resonance space; and a speaker module integrally assembled with the internal antenna module and disposed under the resonance space formed under the main PCB, wherein sound generated by the speaker module advances in multiple directions after passing through the resonance space regardless of whether the folder is opened or closed.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, the same elements will be designated by the same reference numerals although they are shown in different drawings.

Referring to FIGS. 4-8, a folder type portable terminal 10 according to a preferred embodiment of the present invention includes a body 20, a folder 30, and a hinge device 40. The body 20 includes a first housing 200, a second housing 300, and a main PCB 21 located between the first housing 200 and the second housing 300. A microphone 23 and the main PCB 21 are seated in the first housing 200 and the second housing 300, respectively.

Further, the folder type portable terminal 10, which provides a superior quality sound, includes an internal antenna module 500 and a speaker module 100. The internal antenna module 500 is fixed to an upper portion inside of the body 20 and defines a resonance space 600 in which the sound generated by the speaker module 100 can develop into high-quality sound. The speaker module 100 is integrally assembled with the internal antenna module 500. The speaker module 100 is integrally assembled with an eccentric portion of the internal antenna module 500, such that the resonance space 600 enables the sound to advance in multiple directions regardless of whether the folder 30 is closed onto or opened away from body 20.

Figure 7:
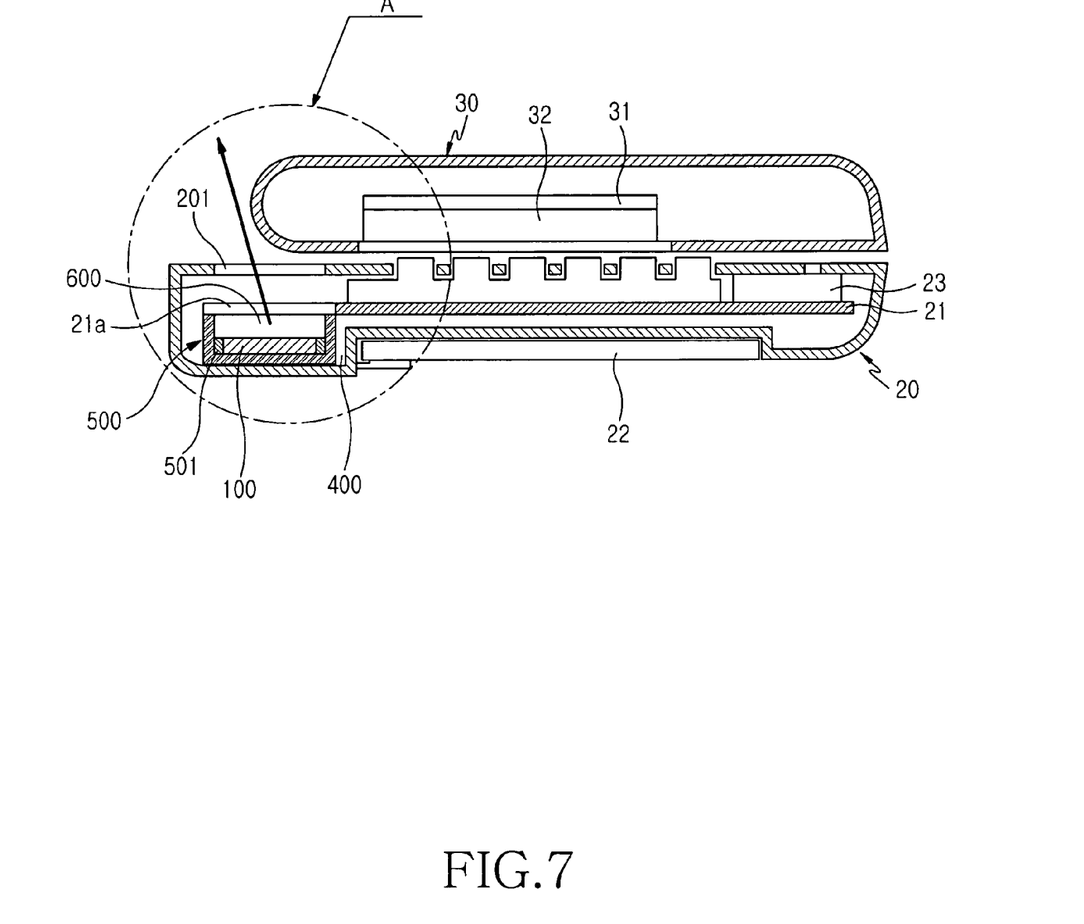
FIG. 7 is a sectional view taken along line B-B' illustrated in FIG. 6.
Figure 8:
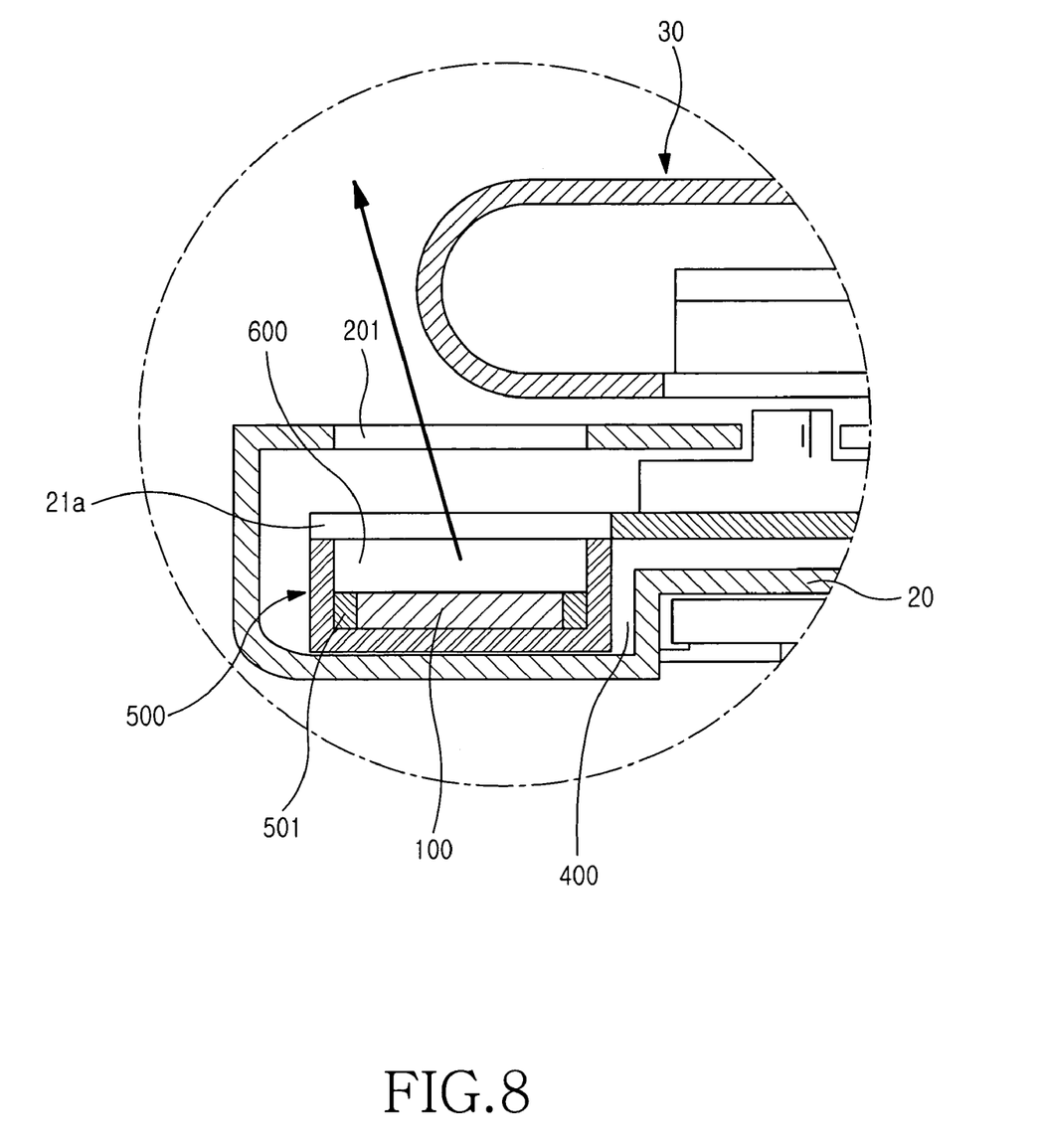
FIG. 8 is an enlarged sectional view of portion A, as illustrated in FIG. 7.

In addition, referring to FIGS. 7 and 8, an upper inner portion of the second housing 300 is recessed in a step shape to define a mounting chamber 400 for housing the internal antenna module 500.

Figure 5:
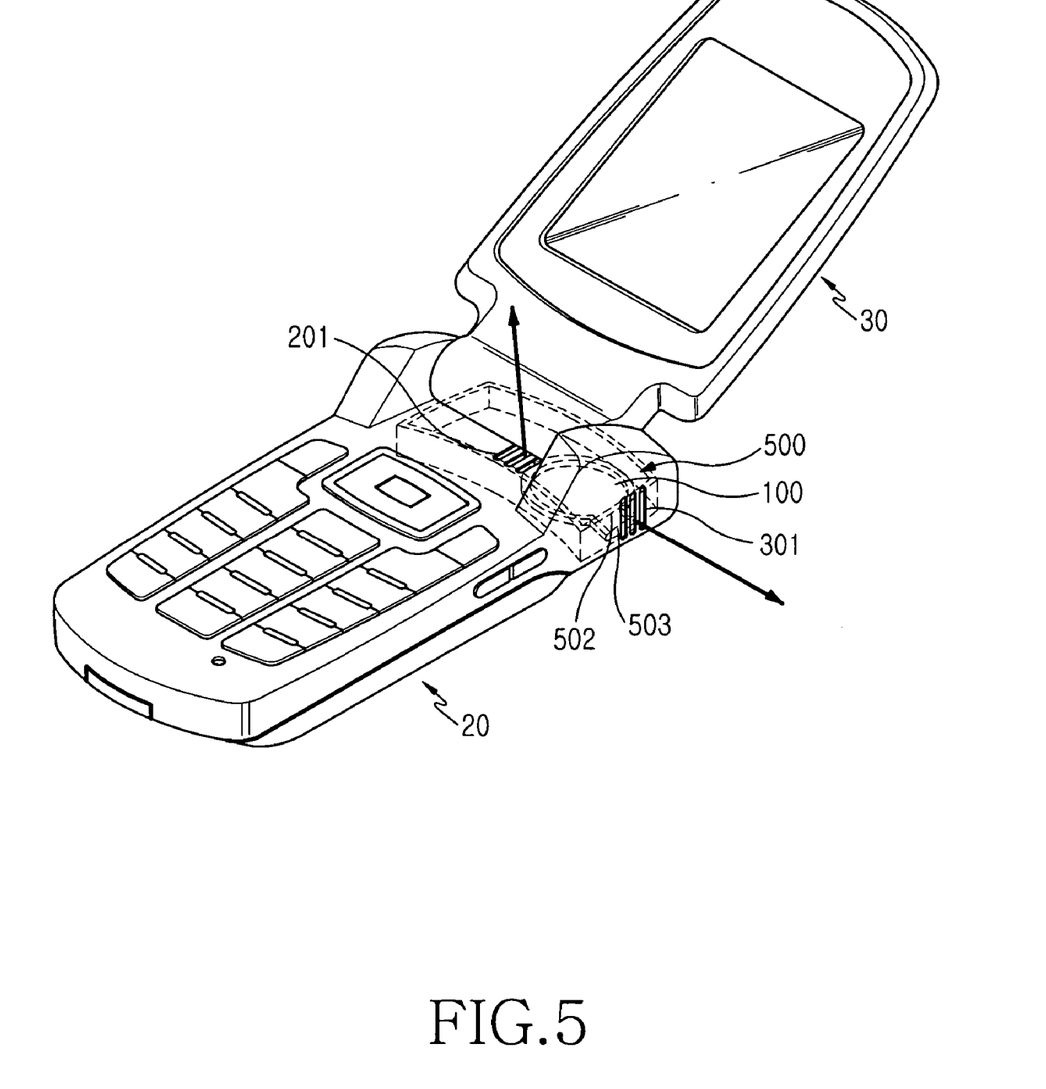
FIG. 5 is a perspective view of a portable terminal having a resonance space according to a preferred embodiment of the present invention in which a folder of the portable terminal has been opened.
Figure 6:
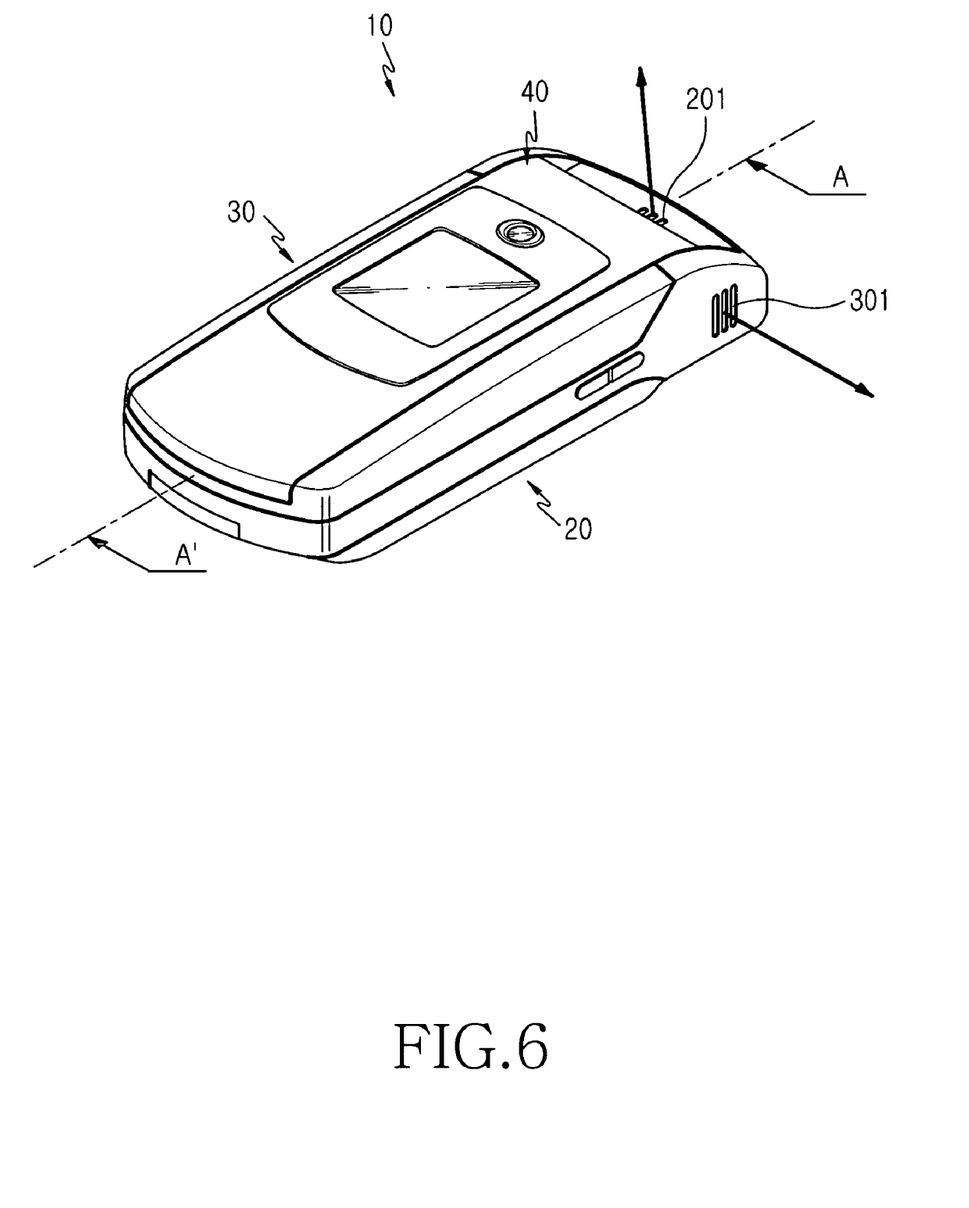
FIG. 6 is a perspective view of a portable terminal having a resonance space according to a preferred embodiment of the present invention in which a folder of the portable terminal has been closed.

Referring to FIGS. 5 and 6, the body 20 has a first speaker hole 201 and a second speaker hole 301 through which the sound generated by the speaker module 100 can advance outward. The first speaker hole 201 is formed through a front surface of the first housing 200 in order to direct the sound from the speaker module 100 to pass through the resonance space 600 before going out of the body 20. The second speaker hole 301 is formed through a side surface of the second housing 300 to direct the sound from the speaker module 100 to go outward through the side surface of the second housing 300. The body 20 includes at least one first speaker hole 201 and at least one second speaker hole 301 facing in perpendicular directions to each other.

Figure 4:
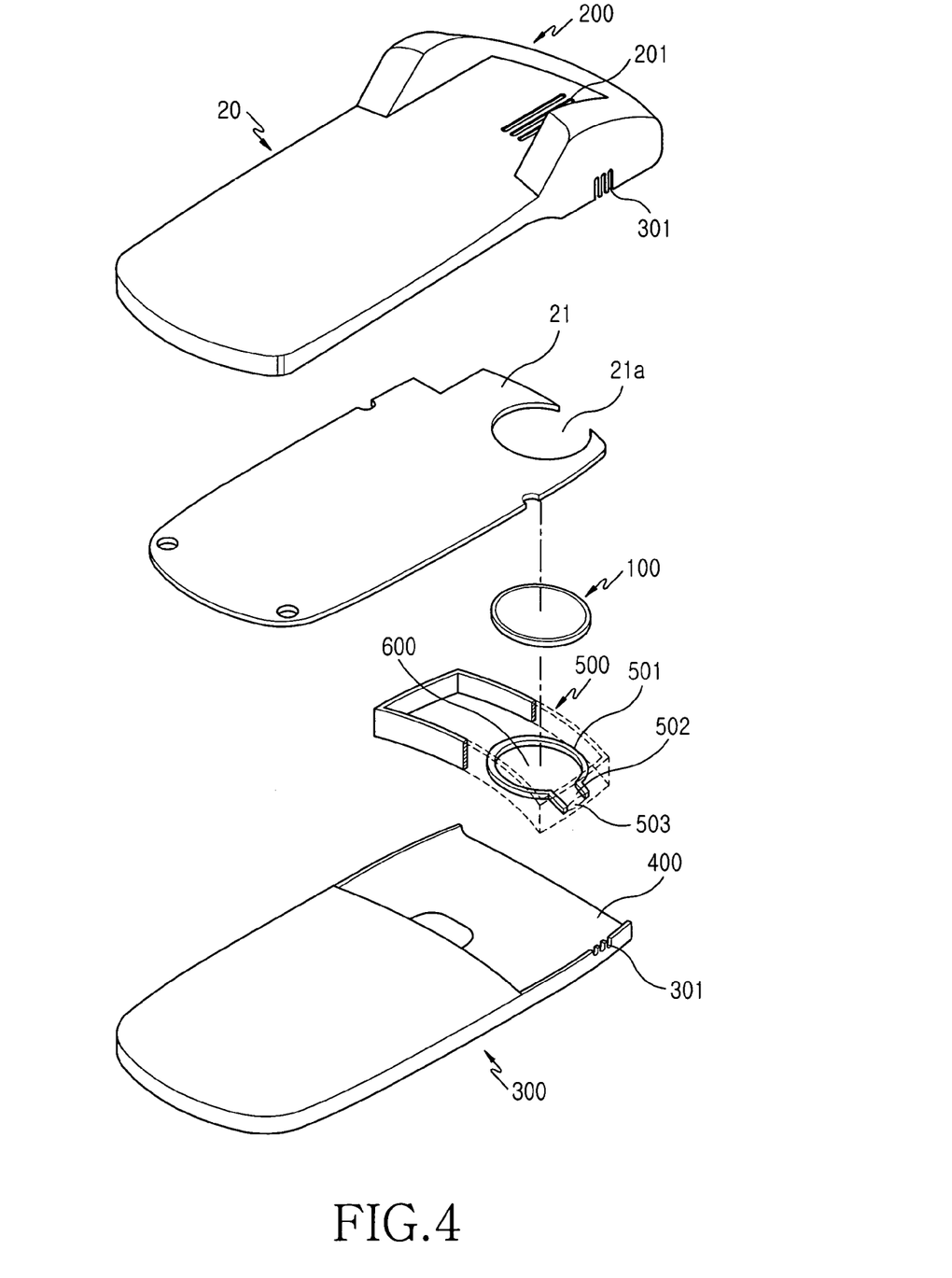
FIG. 4 is an exploded perspective view of a speaker device of a portable terminal having a resonance space according to a preferred embodiment of the present invention.

Referring to FIGS. 4 and 7, the main PCB 21 has a PCB hole 21a formed through the main PCB 21, which is located above the resonance space 600 defined above the speaker module 100. The internal antenna module 500 has a speaker seating groove 501 in which the speaker module 100 is seated.

The internal antenna module 500 also has a sound channel 502 formed through a side portion thereof, which guides the sound from the speaker module 100 to advance in a lateral direction.

A sound channel mouth 503 is formed at the end of the sound channel 502 to enable the sound guided by the sound channel 502 to laterally pass through the second hole 301 of the second housing 300.

Preferably, the speaker module 100 has an ellipsoidal shape.

Hereinafter, an operation of a speaker device of a portable terminal having a resonance space according to a preferred embodiment of the present invention having the construction as described above will be described in detail with reference to FIGS. 4 through 8.

As illustrated in FIG. 6, when a user utilizes the folder-type terminal 10 as a speakerphone, the user can listen to sound from the speaker module 100 in the body 20 without opening the folder 30 of the terminal 10.

As illustrated in FIG. 4, the speaker module 100 is integrally assembled with the internal antenna module 500 provided on the upper inner portion of body 20. More specifically, the speaker module 100 is fixedly seated in the speaker seating groove 501 formed at an eccentric portion of the internal antenna module 500. The speaker module 100 is aligned directly under the PCB hole 21a.

As described above, the body 20 includes the first and second housings 200 and 300. The first and second housings 200 and 300 encase the main PCB 21 and the internal antenna module 500 incorporating the speaker module 100.

Additionally, as illustrated in FIGS. 7 and 8, because the upper inner portion of the second housing 300 is recessed in a step shape to define the mounting chamber 400 for housing the internal antenna module 500, the internal antenna module 500 is seated in the mounting chamber 400. Here, when the internal antenna module 500 has been integrally assembled with the speaker module 100, the resonance space 600 is defined on the speaker module 100. The high quality sound generated by the speaker module 100 is improved and upgraded by the resonance space 600 before propagating outward.

The at least one first speaker hole 201 formed through the front surface of the body 20 enables high quality sound to advance frontward through the first speaker hole 201.

Additionally, the at least one second speaker hole 301 formed through the side surface of the body 20 enables high quality sound to advance sideward through the second speaker hole 301. Here, the sound passing through the second speaker hole 301 is guided by the sound channel 502, passes through the sound channel mouth 503, and then reaches the second speaker hole 301.

As described above with reference to FIG. 4, the sound channel mouth 503 is formed at the end of the sound channel 502.

As a result, the high quality sound generated by the speaker module 100 can advance both frontward and sideward.

When the user uses the terminal in a communication mode, the folder 30 is opened from the body 20 as illustrated in FIG. 5. In this case, the speaker module mounted in the body 20 enables the user to exactly listen to the counterpart's voice. Here, because the counterpart's voice is transferred through the resonance space 600 defined in the body 20, the user can easily hear the counterpart's voice without a loop phenomenon such as hauling or echo. That is, the terminal according to the present invention has an improved sound quality.

Also, even when the body 20 has been in a closed state, the user can hear the same high quality sound.

As described above, the present invention provides a portable terminal having a resonance space without an overall thickness increase in the portable terminal, thereby enabling a user of the terminal to hear a large volume of high quality sound from both the front and the side of the terminal. Also, the present invention eliminates the necessity for a space for the speaker in the folder of the conventional terminal, thereby further reducing the thickness and volume of the terminal.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A speaker for use in a portable terminal, the portable terminal including a body having a main printed circuit board (PCB), the speaker comprising:
   an internal antenna module disposed in the body and having a sound channel;
   a resonance space defined by the internal antenna module; and
   a speaker module integrally assembled with the internal antenna module and disposed under the resonance space formed under a hole formed through the main PCB so that sound generated by the sneaker module, after passing through the resonance space, advances frontward through the hole and sideward through the sound channel.

2. The speaker as claimed in claim 1, wherein the body of the portable terminal comprises:
   a first housing;
   a second housing; and
   an upper inner portion of the second housing that is recessed in a step shape to define a mounting chamber for housing the internal antenna module.

3. The speaker as claimed in claim 1, wherein the body further has at least one first speaker hole and at least one second speaker hole through which the sound from the speaker module advances outward.

4. The speaker as claimed in claim 3, wherein the first speaker hole is formed through a front surface of the body of the portable terminal and the second speaker hole is formed through a side surface of the body of the portable terminal.

5. The speaker as claimed in claim 3, wherein the body of the portable terminal comprises:
   a plurality of first speaker holes arrange along a longitudinal direction of the body of the portable terminal; and
   a plurality of second speaker holes arrange along a direction perpendicular to the longitudinal direction of the body.

6. The speaker as claimed in claim 1, wherein the internal antenna module has a speaker seating groove in which the speaker module is seated.

7. The speaker as claimed in claim 1, wherein the speaker module has an ellipsoidal shape.

8. The speaker as claimed in claim 1, wherein the speaker module is assembled with an eccentric portion of the internal antenna module.

9. A speaker for use in a portable terminal, comprising;
   a resonance space defined by an internal antenna module disposed in a body of the portable terminal; and
   a speaker module for generating sound that advances in multiple directions from a body of the portable terminal, after passing through the resonance space,
   wherein the internal antenna module comprises a sound channel formed through a side portion thereof, for guiding sound from the speaker module to advance in a lateral direction, and a sound channel mouth formed at an end of the sound channel to enable sound guided by the sound channel to laterally pass through a hole in the body of the portable terminal.

10. The speaker as claimed in claim 9, wherein the body comprises at least one first speaker hole formed through a front surface of the body, through which the sound from the speaker module advances outward.

11. The speaker as claimed in claim 9, wherein the body comprises at least one second speaker hole formed through a side surface of the body, through which the sound from the speaker module advances outward.

12. A speaker for use in a folder type portable terminal having a resonance space, the portable terminal including a body having a main printed circuit board (PCB), a folder, and a hinge device for opening and closing the folder onto and from the body, the speaker comprising:
   an internal antenna module disposed at an upper inner portion of the body and defining a resonance space, wherein the internal antenna module has a speaker seating groove in which a speaker module is seated; and
   the speaker module integrally assembled with the internal antenna module locatable at an upper surface of a second housing of the body, and disposed under the resonance space formed under a hole formed through the main PCB,
   wherein sound generated by the speaker module advances in multiple directions, after passing through the resonance space, regardless of the folder being opened or closed.

* * * * *